Patented Nov. 18, 1941

2,262,817

UNITED STATES PATENT OFFICE 2,262,817

PROCESS OF PREPARING UNSATURATED HYDROXY KETONES

Edward B. Peck, Elizabeth, N. J., assignor to Standard Oil Development Company, a corporation of Delaware No Drawing. Application January 25, 1940, Serial No. 315,544

6 Claims. (Cl. 260—594)

The present invention relates to the preparation of compounds useful in organic syntheses as intermediates. More particularly, the present invention relates to improvements in the process of preparing unsaturated hydroxy ketones, such as hydroxy methylene acetone.

One object of the present invention is to prepare organic compounds containing an acyl group in combination with another acyl group, its tautomer, or a substitute for the same, which compounds may then be further reacted to give compounds which may be used as addition agents to motor fuel, the said compounds being added for the purpose of improving the antidetonation characteristics of the motor fuel. A second object of the invention is to prepare organic compounds having resin-forming characteristics and containing an acyl group and a hydroxy group, and also being unsaturated.

These compounds are produced by the addition of carbon monoxide to ketones, which reaction it has been found can be readily carried out in the presence of an alcohol and a sodium alcoholate as catalyst at temperatures of 50–70° C. and moderate pressures of carbon monoxide. It is essential that the reaction be carried out in the absence of moisture or other hydrolyzing agents.

It may be said that the invention comprises in one of its phases a reaction between a compound having the formula R—CO—CH$_3$ and carbon monoxide, the reaction preferably being carried out in the presence of an alkali metal alcoholate, such as sodium ethyl alcoholate. Without placing any limitation on the invention, a specific example is set forth herewith which will illustrate the process of this invention.

Example 1

One mol of acetone was introduced into a reaction vessel provided with a gas inlet conduit and so constructed and arranged as to be adapted to withstand a pressure increase up to 100 atmospheres. The acetone which is introduced into the vessel must be substantially anhydrous. A small amount of sodium methyl alcoholate, which is also substantially free from water, is introduced into the vessel, the amount of such alcoholate being about 1% by weight based on the weight of the acetone. The gas inlet of the vessel is connected up to a source of carbon monoxide and the latter is pumped into the vessel until the amount of the carbon monoxide is about 1 mol. The source of the carbon monoxide may be water-gas, or any other convenient source. The reaction mixture is then heated to a temperature of 50° C., the partial pressure of the carbon monoxide being so adjusted that it amounts to, say, about 2 atmospheres. The reaction will normally have been completed in about 1 to 3 hours. The product obtained has the formula—

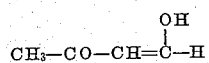

the name of the compound being hydroxy methylene acetone. The yields obtainable are of the order of 90%, based on the original amount of acetone charged to the reaction vessel.

Example 2

In an autoclave of 5 liters capacity there is placed 1 liter of anhydrous acetone with 100 cc. of methyl alcohol which has been reacted with ten grams of metallic sodium. The autoclave is connected to a source of carbon monoxide under 500 lbs. pressure and the autoclave gradually heated. A valve shuts off the supply of carbon monoxide so that reaction can be detected by drop in pressure in the autoclave. At 50° C. the pressure starts to drop rapidly. When the pressure drops to 100 lbs., more carbon monoxide is added and this procedure is repeated until no more carbon monoxide is absorbed. The reaction is exothermic and sufficient cooling means should be provided to maintain the temperature of the reaction mixture below 70° C. The reaction is completed in 2 hours.

It should be stated that instead of using acetone, any ketone having the formula R—CO—CH$_3$ may be used and thus obtain homologues of the products obtained in the above examples. Furthermore, the temperature at which this reaction may be carried out may vary in the range of from about 50° C. to 70° C. The partial pressure of the carbon monoxide may vary from somewhat below atmospheric to 100 atmospheres, but the best results are obtained employing a moderate partial pressure, say a partial pressure of 2 atmospheres. Instead of using sodium methyl alcoholate, derivatives of higher alcohols, such as ethyl, propyl, butyl, and the like, may be used. The amount of the alcoholate employed may vary from ½ to 4% based on the weight of the acetone or other ketone. It should be emphasized that the reaction mixture should be maintained absolutely anhydrous and, of course, this means that the various reactants added to the vessel should be anhydrous.

Numerous changes in the above procedure may

I claim:

1. The process of preparing a compound having the formula $$R-CO-CH=\overset{OH}{\underset{|}{C}}-H$$

where R is an alkyl group, which comprises reacting a compound having the formula $$R-CO-CH_3$$

where R is an alkyl group, with carbon monoxide under anhydrous conditions in the presence of an alkali metal alcoholate of a primary aliphatic alcohol.

2. The process set forth in claim 1, in which the reaction is carried out at a temperature within the range from between 50° C. and 70° C.

3. The process set forth in claim 1 in which partial pressure of carbon monoxide in the reaction lies within the range of from between 1 and 100 atmospheres.

4. The process set forth in claim 1, in which acetone is reacted with carbon monoxide in the presence of sodium methyl alcoholate.

5. The process set forth in claim 1, in which anhydrous ketone is reacted with anhydrous carbon monoxide in the presence of anhydrous sodium methyl alcoholate.

6. The process set forth in claim 1, in which anhydrous acetone is reacted with anhydrous carbon monoxide in the presence of anhydrous sodium ethyl alcoholate.

EDWARD B. PECK.